C. R. ALLEN.
VEHICLE TOP SUPPORT.
APPLICATION FILED DEC. 2, 1913.

1,244,402.

Patented Oct. 23, 1917.

WITNESSES=
O. M. Kappler

INVENTOR
Charles R. Allen
BY Jay Oberlin
ATTORNEYS

UNITED STATES PATENT OFFICE.

CHARLES R. ALLEN, OF ASHTABULA, OHIO, ASSIGNOR TO THE ASHTABULA BOW SOCKET COMPANY, OF ASHTABULA, OHIO, A CORPORATION OF OHIO.

VEHICLE-TOP SUPPORT.

1,244,402.          Specification of Letters Patent.      Patented Oct. 23, 1917.

Application filed December 2, 1913. Serial No. 804,158.

*To all whom it may concern:*

Be it known that I, CHARLES R. ALLEN, a citizen of the United States, and a resident of Ashtabula, county of Ashtabula, and State of Ohio, have invented a new and useful Improvement in Vehicle-Top Supports, of which the following is a specification, the principle of the invention being herein explained and the best mode in which I have contemplated applying that principle, so as to distinguish it from other inventions.

My invention relates to an improved vehicle top which may be readily operated by a single person and which is an improvement over existing types of tops in that all bows which tend to obstruct the entrance to the forward compartment are entirely eliminated without, however, affecting the rigidity of the support for the top itself. To the accomplishment of these and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
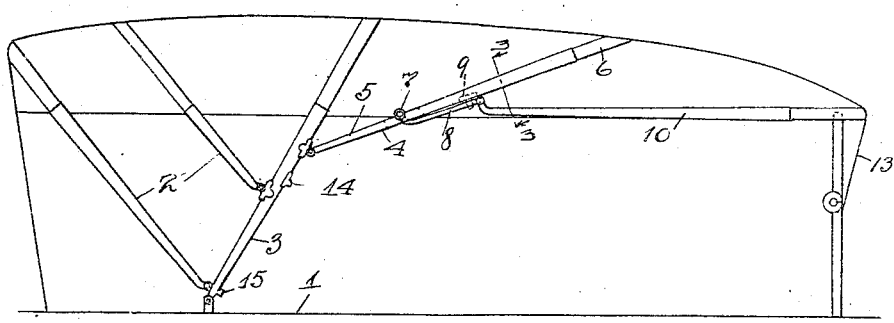
Figure 2:
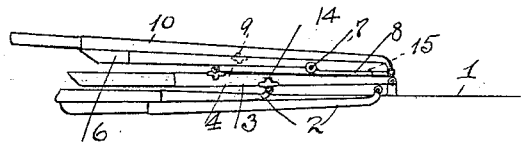
Figure 3:
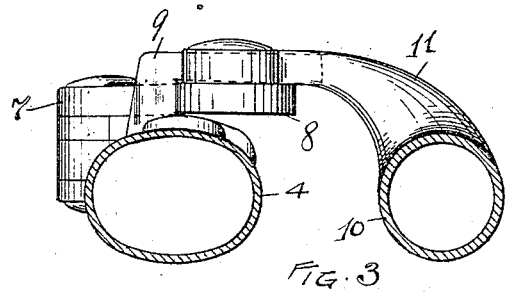

Figure 1 is a side elevation showing my improved top in its raised position; Fig. 2 is a similar view, but showing the top when folded; and Fig. 3 is a transverse section on the line 3—3 in Fig. 1.

My improved top is intended for numerous uses which need not be specifically referred to and the fact that we here illustrate it as applied to a vehicle body such as an automobile is not intended to imply a restriction to its use in such connection alone.

Adjacent to the rear end of a suitable vehicle body 1, I pivotally attach one or more rear bow socket members 2 of which one extends forwardly and may for convenience be termed the main bow 3. Adjacent to the upper end of such main bow 3 there is pivotally attached an auxiliary, forwardly extending bow socket member 4. This bow socket member 4 is formed in two portions 5 and 6 which are pivotally connected by means of a stop hinge 7, such hinge serving to maintain the two portions in alinement when the bow is extended. The precise point of attachment of the auxiliary member 4 to the rear member, or main bow 3, is unimportant and will depend to a large extent upon the height of the top and other features of construction which will be peculiar to the vehicle upon which the top is to be used.

Pivotally attached to the stop hinge 7 is an arm or shifter link 8 which is adapted to be received in a supporting lug 9 mounted upon one side of the outer portion 6 of the auxiliary member 4 in the position to maintain the shifter link 8 parallel with the outer portion 6 of the auxiliary bow 4. To the outer or free end of such link 8 I pivotally attach an outrigger bow socket member 10 which has its engaged end 11 offset in order to bring the bow 10 into the same plane as the other bow socket members, such outrigger extending substantially horizontally and forward and receiving the forward end of the top covering 12 which is supported upon the upper ends of the other bow socket members as illustrated. The arms or links 8, taken in conjunction with the bow 10, may be regarded as constituting an articulated outrigger bow.

In the raised position of the top the various members will be in the positions shown in Fig. 1 when suitable means, preferably in the form of cords 13, will be supplied for attaching the forward end of the outrigger to some suitable point on the vehicle. In this position the thrust of the outrigger 10 will be against the outer end of the shifter link 8 and will tend to maintain the same in engagement with the supporting lug 9. Similarly, the weight supported by the outer end of the auxiliary member 4 serves to maintain the two portions 5 and 6 of this member in their alined position.

In order to fold the top it is necessary to disconnect the forward end of the outrigger 10 from the vehicle and to then swing the shifter link 8 into a position alongside of the inner portion of the auxiliary member 4. The two portions of the latter member are then moved downward until in a parallel position, all of the bows being disposed parallel to the rear bows, and the inner part 5 of the auxiliary member 4 being received in a suitable spacing lug 14 attached to the front side of the main bow 3. In order to maintain the link 8 and outrigger 10 in proper position when the top is in its folded position, I supply suitable means for attaching the same to the body, such means preferably consisting of a lug 15 on the bow 3 to which the link 8 may be fastened by a suitable bolt or pin (not shown). Other means for so attaching the link 8 may of course be used. The compact arrangement of the bows when folded is shown in Fig. 2.

The present top may be folded by a single person in the manner described. The advantages of this type of top are too well recognized to require specific enumeration, but attention is directed to the extremely simple means designed for the purpose and to the compact arrangement of the bows when the top is folded.

It is unnecessary to specifically point out that the socalled "main" bow may be attached either to the body as illustrated or to one of the rear bows, as in either case its functions as a support for the auxiliary and outrigger bows will be the same.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

1. In a vehicle top, the combination of a main bow directly pivotally attached to the vehicle body; an auxiliary bow; and an articulated outrigger bow, one of said two last-named bows being pivotally attached to said main bow near the lower edge of the top covering and the other being pivotally attached in turn to said one, the portions of said outrigger bow being adapted to form an upwardly extending elbow and said outrigger and auxiliary bows being adapted to inter-engage in the extended condition of the top so as to prevent upward breaking of such elbow.

2. In a vehicle top, the combination of a main bow directly pivotally attached to the vehicle body; an auxiliary bow; an outrigger bow; and an arm pivotally attached to the inner end of said outrigger bow, said auxiliary bow and said arm being pivotally connected together and the one thereof being in turn pivotally attached to said main bow near the lower edge of the top covering, said outrigger bow and arm being adapted to form an upwardly extending elbow and said arm being adapted to engage said auxiliary bow in the extended condition of the top so as to prevent upward breaking of such elbow.

3. In a vehicle top, the combination of a main bow suitably attached to the vehicle body; an articulated auxiliary bow; and an articulated outrigger bow, one of said two last-named bows being pivotally attached to said main bow and the other being pivotally attached in turn to said one, the portions of said outrigger bow being adapted to form an upwardly extending elbow, and said outrigger and auxiliary bows being adapted to inter-engage in the extended condition of the top so as to prevent upward breaking of such elbow.

4. In a vehicle body, the combination of a main bow suitably attached to the vehicle body; an articulated auxiliary bow; an outrigger bow; and an arm pivotally attached to the inner end of said out-rigger bow near the lower edge of the top covering, said auxiliary bow and said arm being pivotally connected together and the one thereof being in turn pivotally attached to said main bow, said outrigger bow and arm being adapted to form an upwardly extending elbow and said arm being adapted to engage said auxiliary bow in the extended condition of the top so as to prevent upward breaking of such elbow.

5. In a vehicle top, the combination of a main bow directly pivotally attached to the vehicle body; an auxiliary bow; and an articulated outrigger bow, said auxiliary bow being pivotally attached to said main bow near the lower edge of the top covering, and said outrigger bow being pivotally attached in turn to said auxiliary bow, the portions of said outrigger bow being adapted to form an upwardly extending elbow, and said outrigger and auxiliary bows being adapted to inter-engage in the extended condition of the top so as to prevent upward breaking of such elbow.

6. In a vehicle top, the combination of a main bow directly pivotally attached to the vehicle body; an auxiliary bow; an outrigger bow; and an arm pivotally attached to the inner end of said out-rigger bow, said auxiliary bow being pivotally attached to said main bow near the lower edge of the top covering, and said arm being in turn pivotally attached to said auxiliary bow, said outrigger bow and arm being adapted to form an upwardly extending elbow, and said arm being adapted to engage said auxiliary bow in the extended condition of the top, so as to prevent upward breaking of such elbow.

7. In a vehicle top, the combination of a main bow suitably attached to the vehicle body; an articulated auxiliary bow having a stop joint between its respective portions; and an articulated outrigger bow, the inner end of said auxiliary bow being pivotally attached to said main bow, and the inner end of said outrigger bow being pivotally attached in turn to said auxiliary bow at the joint therein, the portions of said outrigger bow being adapted to form an upwardly extending elbow, and said outrigger and auxiliary bows being adapted to inter-engage in the extended condition of the top so as to prevent upward breaking of such elbow.

8. In a vehicle top, the combination of a main bow pivotally attached to the body of the vehicle; an out-rigger bow; an auxiliary, forwardly extending bow disposed intermediately of said main and out-rigger bows and connected to said main bow near the lower edge of the top covering, and arms pivotally connected to said out-rigger and auxiliary bows and adapted to provide in the raised condition of the top two spaced points of engagement between said auxiliary bow and said arms, the latter coöperating with said bows to form a rigid but foldable truss normally maintained in rigid position by the tension along the top.

9. In a vehicle top, the combination of a main bow pivotally attached to the body of the vehicle, an auxiliary, forwardly extending bow formed of two hinged portions, said bow being pivotally attached to said main bow intermediate the ends of the latter, a shifter link pivotally attached to the hinge between the two portions of said auxiliary bow, an out-rigger bow pivotally attached to the outer end of said link, and a supporting lug mounted on said auxiliary bow and adapted to receive said shifter link in position to maintain the same parallel to said auxiliary bow, said link and bows being constructed and positioned so that the rearward, longitudinal thrust on said out-rigger bow will serve to maintain such two portions of said auxiliary bow in alinement and said shifter link parallel thereto.

Signed by me, this 28 day of November, 1913.

CHARLES R. ALLEN.

Attested by—
 FRANK W. WAGNER,
 RUDOLF H. PFAFF.

Copies of this patent may be obtained for five cents each, by addressing the "Commissioner of Patents, Washington, D. C."